US006474725B2

(12) United States Patent
Sotiroff et al.

(10) Patent No.: US 6,474,725 B2
(45) Date of Patent: Nov. 5, 2002

(54) REINFORCED CARGO DOORS

(75) Inventors: John Andrew Sotiroff, Bloomfield Hills, MI (US); Roch Joseph Tolinski, Howell, MI (US); Charles Berry Hopson, Lebanon, TN (US); George Rene Chene, Sterling Heights, MI (US); Simon Blair Dobson, Folkestone (GB); Enrico Fin, Lake Orion, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/872,667

(22) Filed: Jun. 1, 2001

(65) Prior Publication Data
US 2002/0014785 A1 Feb. 7, 2002

Related U.S. Application Data

(60) Provisional application No. 60/220,712, filed on Jul. 26, 2000.

(51) Int. Cl.[7] ................................................ B62D 33/06
(52) U.S. Cl. ............................... 296/190.11; 296/26.11; 296/146.6
(58) Field of Search ........................ 296/26.11, 57.1, 296/146.5, 146.6, 901, 190.11, 188; 49/502

(56) References Cited

U.S. PATENT DOCUMENTS

| 2,349,907 | A | | 5/1944 | Kos et al. | |
|---|---|---|---|---|---|
| 3,868,141 | A | * | 2/1975 | Johnson | |
| 4,290,235 | A | | 9/1981 | Jahnle et al. | |
| 4,480,868 | A | * | 11/1984 | Koto | |
| 4,915,442 | A | * | 4/1990 | Gardweidner | 296/188 |
| 5,221,121 | A | | 6/1993 | Zichner et al. | |
| 5,224,752 | A | | 7/1993 | Marshall | |
| 5,314,228 | A | | 5/1994 | Figge, Sr. | |
| 5,431,476 | A | | 7/1995 | Torgaki | |
| 5,934,727 | A | * | 8/1999 | Storc et al. | 296/26.11 |
| 6,056,349 | A | * | 5/2000 | Seksaria et al. | 296/146.6 |
| 6,220,652 | B1 | * | 4/2001 | Browne et al. | 296/188 |
| 6,260,916 | B1 | * | 7/2001 | Hunt | 296/190.11 |

* cited by examiner

Primary Examiner—Joseph D. Pape
(74) Attorney, Agent, or Firm—Carlson, Gaskey & Olds

(57) ABSTRACT

The present invention provides a reconfigurable intermediate panel (RIP) arranged between the cab and the cargo bed of a vehicle. The vehicle has a vehicle body structure that separates the cab and the cargo bed. The RIP is arranged within an opening in the vehicle body structure for providing access to the cab from the cargo bed. The RIP includes a door structure having first and second opposing portions adjacent to opposing sides of the opening when the RIP is in a closed position. A plurality of cable spans the first and second portions for strengthening the door structure and barring the entry of cargo from the cargo bed into the cab when the structure is in the closed position. In one embodiment, the cables extend from opposing portions of a door frame. In another embodiment, the cables are embedded in a plastic panel, which is secured to a door frame. Accordingly, the above invention provides an RIP that provides an improved structural barrier between the cargo bed and the cab from heavy cargo.

19 Claims, 2 Drawing Sheets

REINFORCED CARGO DOORS

CROSS REFERENCE TO RELATED APPLICATIONS

This application claims priority to U.S. Provisional Application No. 60/220,712, which was filed on Jul. 26, 2000.

BACKGROUND OF THE INVENTION

This invention relates to a reinforcement for a vehicle door, and more specifically, a reinforcement for a cargo door used between a vehicle cab and a vehicle bed.

Sports utility vehicles (SUVs) have become very popular in recent years and are suitable for transporting many passengers or smaller cargo. A recent vehicle design innovation has been to cross an SUV with a pick-up truck to increase the transport capacity for larger cargo. These hybrid vehicles have a spacious extended cab, which is larger than the typical pick-up extended cab, for comfortably seating passengers. To maintain generally the same vehicle length, the cargo bed is shorter than a typical pick-up. Because the ability to transport larger cargo is compromised with the shorter cargo bed, it is desirable to extend the cargo bed. One design utilizes a reconfigurable intermediate panel (RIP) between the cab and cargo bed to extend the cargo bed and accommodate larger cargo.

RIPs may be opened to permit cargo to extend from the cargo bed into the cab and then closed to separate the cab and cargo bed. In one type of arrangement, the RIP may be pivotally connected to the vehicle by a hinge so that it may be rotated out of the way when the REP is opened. Pick-ups have separate box-shaped cargo beds that are secured onto the. vehicle behind the vehicle frame. If heavy cargo were to shift or move violently forward, the front wall of the cargo box, in addition to the rear wall of the cab, would adequately protect the passengers under most conditions. However, with the hybrid vehicles discussed above, the structural barrier between the cargo bed and the cab is reduced, that is, the front wall of the cargo bed is eliminated, which reduces the protection provided to the passengers from heavy cargo. Therefore, what is needed is an RIP that provides an improved structural barrier between the cargo bed and the cab from heavy cargo.

SUMMARY OF THE INVENTION AND ADVANTAGES

The present invention provides a reconfigurable intermediate panel (RIP) arranged between the cab and the cargo bed of a vehicle. The vehicle has a vehicle body structure that separates the cab and the cargo bed. The RIP is arranged within an opening in the vehicle body structure for providing access to the cab from the cargo bed. The RIP includes a door structure having first and second opposing portions adjacent to opposing sides of the opening when the RIP is in a closed position. A plurality of cable spans the first and second portions for strengthening the door structure and barring the entry of cargo from the cargo bed into the cab when the structure is in the closed position. In one embodiment, the cables extend from opposing portions of a door frame. In another embodiment, the cables are embedded in a plastic panel, which is secured to a door frame. Accordingly, the above invention provides an RIP that provides an improved structural barrier between the cargo bed and the cab from heavy cargo.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
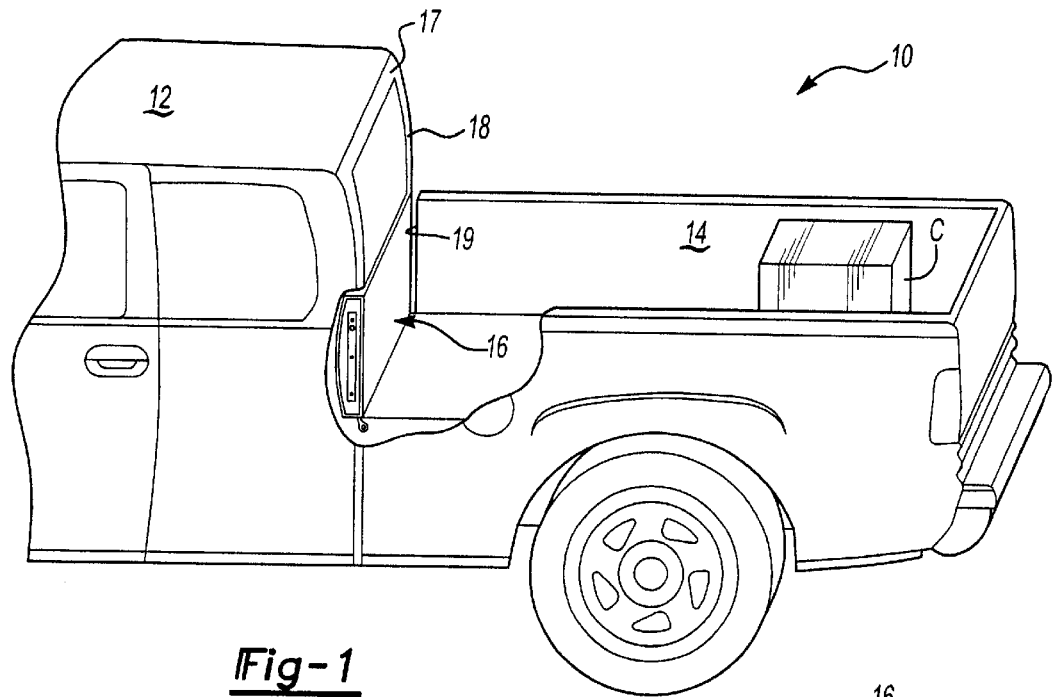
FIG. 1 is a perspective view of a vehicle utilizing the reinforced cargo door of the present invention.

A vehicle 10 is shown in FIG. 1 having a cab 12 and a cargo bed 14. A vehicle body structure 17 separates the cargo bed 14 from the cab 12. The cargo bed 14 and cab 12 may both be located in the interior of a vehicle. As described above, it is desirable to provide access to the cab 12 from the cargo bed 14 to enable the vehicle 10 to transport larger cargo. To this end, the vehicle body structure 17 has an opening 19 with opposing sides or C-pillars 18 and a bottom arranged between the C-pillars 18. An RIP 16 is arranged in the opening 19 and is shown in the closed position in FIG. 1. The RIP 16 prevents large, heavy cargo C from entering the cab 12. For vehicles in which the cargo bed 14 and cab 12 are located interiorly, the RIP 16 may be fold down seat backs.

Figure 2A:
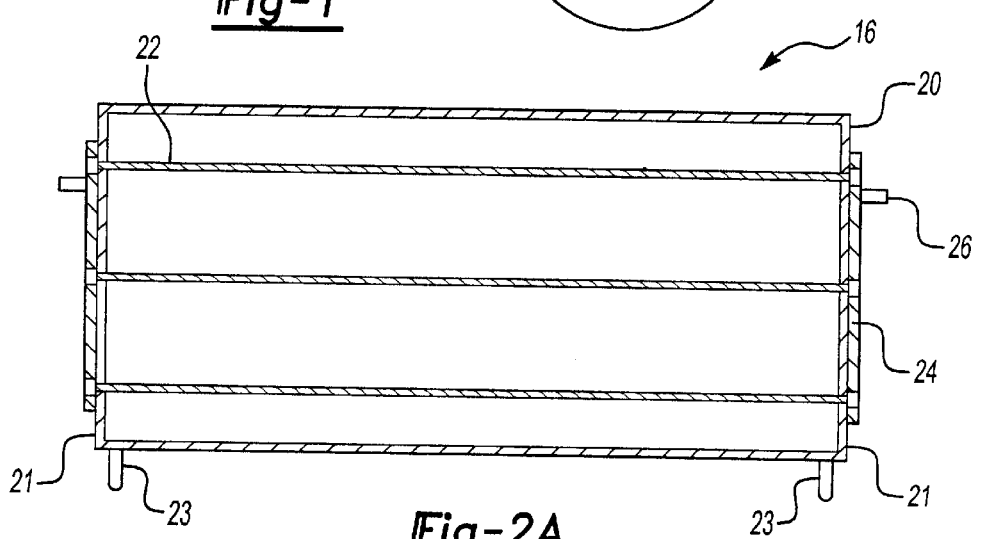
FIG. 2A is a front elevational view of one embodiment of the present invention.
Figure 2B:
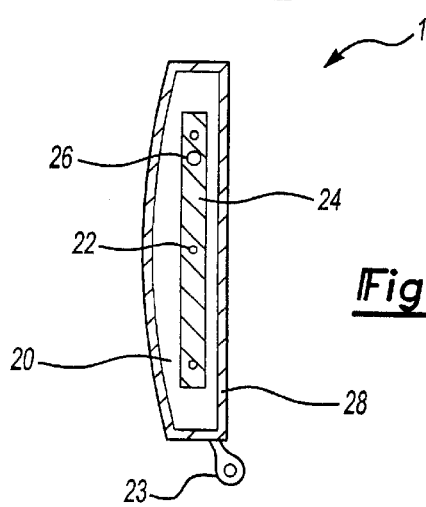
FIG. 2B is a side elevational view of the embodiment shown in FIG. 2A.

Referring to FIGS. 2A and 2B, the RIP 16 comprises a structure that typically includes a door frame 20. The door frame 20 includes opposing ends 21 and a bottom with a hinge 23. The hinge 23 pivotally connects the RIP 16 to the vehicle 10 so that it may be moved between an open and closed position. Of course, the RIP 16 may be secured to the vehicle 10 in any suitable manner. Typically, when the RIP 16 is opened it is received within a pocket or stowed out of the way for convenience. Previously, RIP 16 or cargo doors have been reinforced using traditional side door impact technology. Side doors have been typically reinforced using large metal tubes or rails to prevent colliding vehicles from penetrating the cabin area of the vehicle. The metal tubes of the prior art are necessarily heavy and large thereby requiring a larger RIP 16. RIP 16 need not prevent large objects such as colliding vehicles from penetrating the cab 12, and therefor, RIP 16 need not be reinforced to such a great degree.

With the present invention, the RIP 16 is reinforced by a plurality of tensile elements or cables 22 which extend between opposing portions 21. The cables may be multi-stranded or single stranded and may be constructed from dry suitable material. The ends of the cables 22 are secured to the opposing portions 21 so that excessive deformation of the RIP 16 may be avoided when cargo collides with it. Brackets 24 may be supported on the opposing portions 21 to receive the ends of the cables 22. If RIP 16 pivots from the bottom by hinges 23, the brackets 24 may includes latches 26 that engage with C-pillars 18 to retain RIP 16 in the closed position. In this manner, the cables 22 are secured to the C-pillars to take advantage of the structural integrity provided by the vehicle body structure 17. The RIP 16 may also include a panel 28' to provide an aesthetically pleasing appearance.

Figure 3:
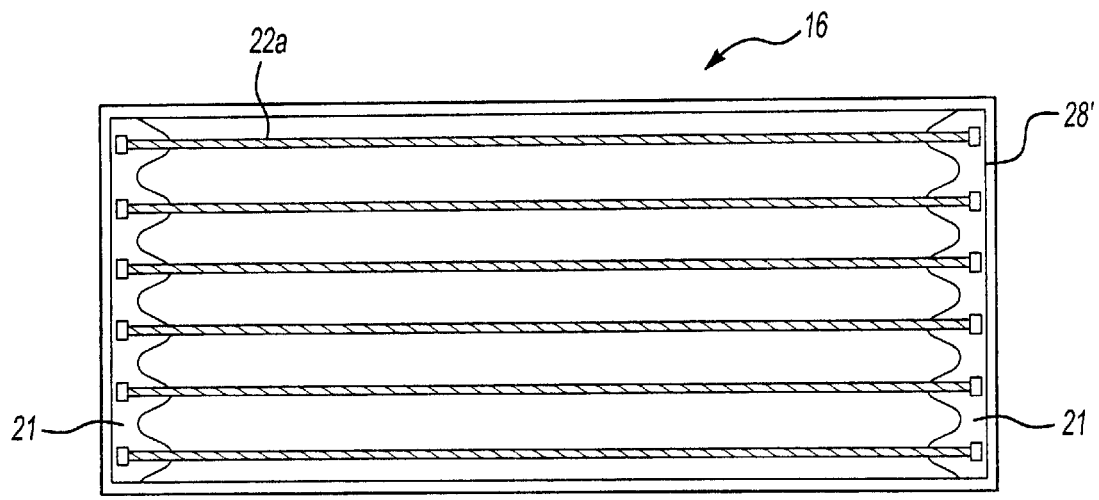
FIG. 3 is a partially broken front elevational view of another embodiment of the present invention.
Figure 4:
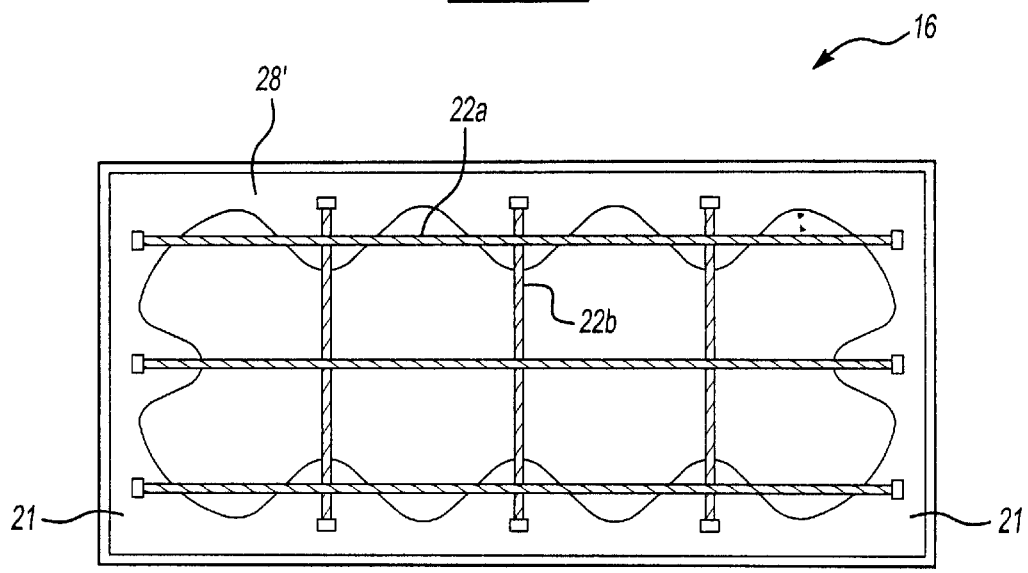
FIG. 4 is a partially broken front elevational view of yet another embodiment of the present invention.

Typically, steel panels 28 are secured to a door frame 20. However, as shown in embodiments depicted in FIGS. 3 and 4, the panel may be reinforced. A plastic panel 28' may have horizontally arranged cables 22a embedded in the plastic material to reinforce the RIP 16. The plastic panel 28' may then be secured to the door frame 20. As shown in FIG. 4, the plastic door panel 28' may also include vertical cables 22b in addition to the horizontal cables 22a to further reinforce the RIP 16. The panel 28' may be used in addition to or in place of the cables disposed in door frame 20 shown in FIGS. 2A and 2B.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A vehicle having a cab and a cargo bed, the vehicle comprising:

a vehicle body structure separating said cab and said cargo bed with an opening in said vehicle body structure for providing access to said cab from said cargo bed, said opening including opposing sides;

a door structure having first and second opposing portions adjacent to said opposing sides of said opening with said door structure in a closed position;

a plurality of cables spanning said first and second portions for strengthening said structure and barring the entry of cargo from said cargo bed into said cab with said structure in said closed position.

2. The vehicle according to claim 1, wherein said door structure is a door frame and said first and second portions removably engage said opposing sides in said closed position.

3. The vehicle according to claim 2, wherein said opening includes a bottom interposed between said opposing sides, said door structure pivotally mounted to said bottom side for movement from said closed position to an open position.

4. The vehicle according to claim 2, wherein said cables have first and second opposing ends secured to said first and second opposing portions, respectively, with said cables being generally taut.

5. The vehicle according to claim 4, wherein said cables are parallel to one another.

6. The vehicle according to claim 4, wherein said first and second portions include brackets secured to said door frame with said first and second ends secured to said brackets on said first and second portions, respectively.

7. The vehicle according to claim 1, wherein said cables are bundles of metal strands.

8. The vehicle according to claim 7, wherein said cables are steel.

9. A vehicle having a cab and a cargo bed, the vehicle comprising:

a vehicle body structure separating said cab and said cargo bed with an opening in said vehicle body structure for providing access to said cab from said cargo bed, said opening including opposing sides;

a door structure having first and second opposing portions adjacent to said opposing sides of said opening with said door structure in a closed position;

a plurality of cables spanning said first and second portions for strengthening said structure and barring the entry of cargo from said cargo bed into said cab with said structure in said closed position, wherein said door structure is a plastic panel and said cables are embedded in said panel.

10. The vehicle according to claim 9, wherein said cables are parallel to one another.

11. The vehicle according to claim 10, further including generally vertically-oriented cables overlapping said cables spanning said first and second portions.

12. The vehicle according to claim 9, wherein said panel is polyurethane.

13. A reinforced door for a vehicle comprising;

a door frame having first and second opposing portions, wherein said door frame has a bottom interposed between said first and second opposing portions, said bottom includes a hinge and said first and second opposing portions include a latch; and a plurality of cables having first and second ends secured to first and second opposing portions, respectively, with said first ends being spaced apart from one another and said second ends being spaced apart from one another.

14. The reinforced door according to claim 13, wherein said latches include brackets with said first and second ends secured to said brackets on said first and second portions, respectively.

15. The reinforced door according to claim 13, wherein said cables are parallel to one another.

16. A reinforced door for a vehicle comprising:

a door frame;

a plastic door panel secured to said door frame and having first and second opposing portions; and a plurality of cables spanning first and second opposing portions and embedded in said panel.

17. The reinforced door according to claim 16, wherein said cables are parallel to one another.

18. The reinforced door according to claim 17, further including generally vertically-oriented cables overlapping said cables spanning said first and second portions.

19. The reinforced door according to claim 16, wherein said panel is polyurethane.

\* \* \* \* \*